United States Patent Office 2,962,303
Patented Nov. 29, 1960

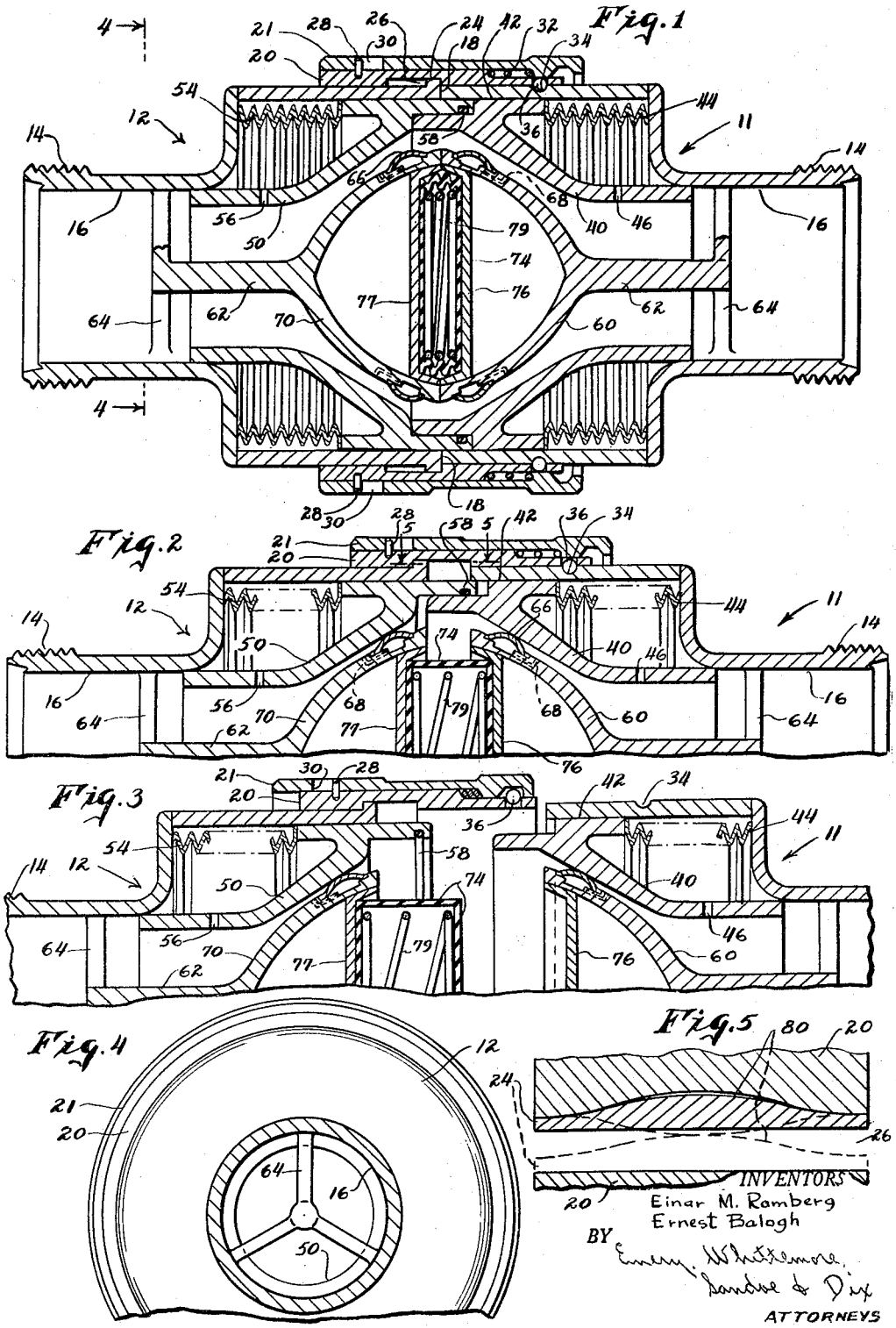

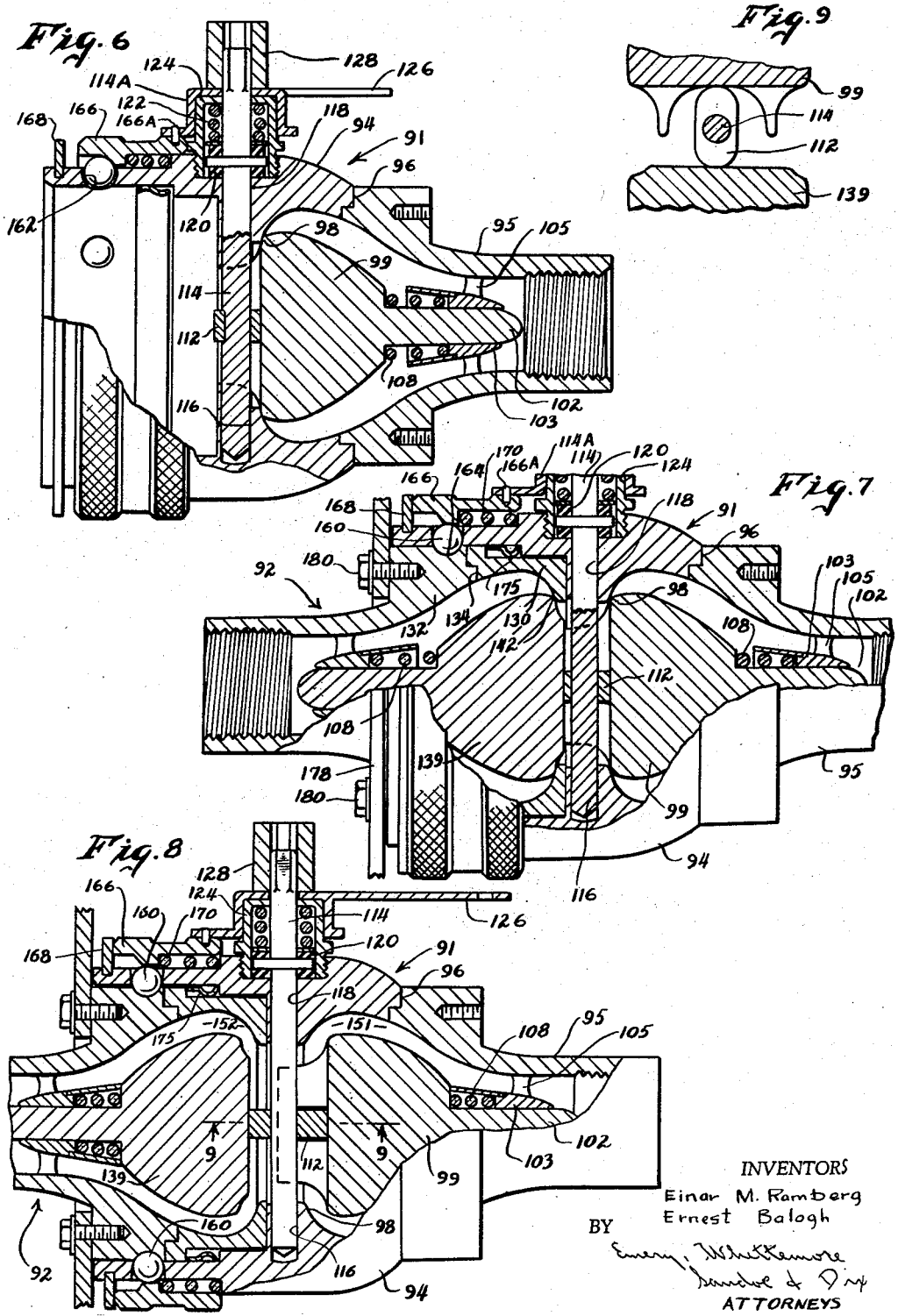

2,962,303

DISCONNECT COUPLINGS

Einar M. Ramberg, Longmeadow, and Ernest Balogh, Wilbraham, Mass., assignors to Titeflex, Inc., Springfield, Mass., a corporation of Massachusetts Filed Dec. 6, 1957, Ser. No. 701,253

15 Claims. (Cl. 284—18)

This invention relates to couplings and more especially to couplings which can be disconnected quickly while the lines and the coupling are full of fluid, and without any substantial spilling of the fluid.

It is an object of the invention to provide an improved disconnect coupling with valve means for preventing flow of fluid from the opposite halves of the coupling when it is disconnected while full of fluid. Another object is to provide a coupling of the character indicated with valve means that operate automatically to seal the lines against the escape of fluid when the coupling is disconnected. It is a feature of the invention that the coupling can be disconnected quickly and the automatic operation of the valve means further reduces the time consumed in disconnecting the lines.

Another object of the invention is to provide a disconnect coupling with automatically-closing valve means and with special provisions for reducing to a minimum any leakage of fluid from the lines when the halves of the coupling are disconnected, with the coupling full of fluid.

Another object is to provide a coupling of the character indicated and suitable for fluid flow in either direction. In the preferred embodiment an obstruction of fair form is provided at the dividing zone of the coupling and the fluid flows through an annular passage around the obstruction with little or no disturbance of the flow pattern. The valve means of the coupling may be shells surrounding the obstruction and movable longitudinally into and out of contact with the obstruction, or they may be parts of the obstruction movable towards and from surfaces of the coupling.

In accordance with some feature of the invention the obstruction is of generally ellipsoidal shape with the major axis of the ellipsoid extending along the longitudinal axis of the coupling; and the valve elements are made in different ways and operated by different controls. The confronting faces of the ellipsoid are preferably at a plane through its minor axis.

Other objects, features and advantages of the invention will appear or be pointed out as the description proceeds.

In the drawing, forming a part hereof, in which like reference characters indicate corresponding parts in all the views;

Figure 1 is a longitudinal sectional view taken through a coupling made in accordance with this invention;

Figure 2 is a fragmentary sectional view through the coupling shown in Figure 1 but with the valve elements of the coupling in closed position;

Figure 3 is a view similar to Figure 2 but with the opposite halves of the coupling entirely disconnected;

Figure 4 is a sectional view taken on the line 4—4 of Figure 1;

Figure 5 is a diagram showing a development of certain of the parts and illustrating the way in which the valve elements are moved into open position after the coupling is connected.

Figure 6 is a sectional view showing one side of a modified connector embodying this invention;

Figure 7 is a view, mostly in section, showing the connector structure of Figure 6 joined with a complementary modified connector but with the valves in closed positions;

Figure 8 is a view, mostly in section, of the parts shown in Figure 7 but with the valve elements in their open positions; and Figure 9 is a sectional view taken on the line 9—9 of Figure 8.

The coupling of this invention includes a right fitting 11 and a left fitting 12. Each of these fittings is connected with a different one of the two lines which are to be connected and disconnected by means of the coupling. Threads 14 are shown on the fittings 11 and 12 for connecting the fittings with their respective lines, but it will be understood that these threads are merely illustrative of means for connecting the fittings to their lines, and that any desired connections can be used. There is a passage 16 through each of the fittings 11 and 12 for the flow of fluid.

At their confronting end portions, the fittings 11 and 12 increase in diameter and the end faces of the fittings contact with one another, when the coupling is connected, along a plane 18. There are means for connecting the fittings 11 and 12 together and these means include an inner sleeve 20 and an outer sleeve 21. Sliding movement of the inner sleeve 20 on the fitting 12 is limited by a low flange 24 extending outwardly from the fitting 12 and into a recess 26 in the inner face of the inner sleeve 20.

The flange 24 has a sloping back face 80, as shown in the development provided by Figure 5. This sloping back face provides a cam surface which cooperates with a complementary cam surface at the back of the groove 26. Figure 5 is a view showing the circumference of the sleeve 20 and flange 24 as they would appear if unwrapped into a plane structure; the width of Figure 5 representing a portion of the circumferential extent. The design configuration is repeated on the circumference as the requirements dictate. Sliding movement of the outer sleeve 21 on the inner sleeve 20 is limited by a stud 28 extending outwardly from the inner sleeve 20 into a groove 30 in the outer sleeve, as shown in Figure 1.

There is a similar stud 28 and groove 30 at diametrically opposite locations around the coupling. The slots 30 are only slightly wider than the diameter of the studs 28 so that these slots permit longitudinal movement of the outer sleeve 21 along the inner sleeve 20 but prevent rotation of the outer sleeve 21 on the inner sleeve. When the outer sleeve 21 is rotated, the stud 28 causes the inner sleeve 20 to rotate as a unit with the outer sleeve. The purpose of this will be explained in connection with Figure 5.

There is a helical spring 32 located in a chamber between the inner and outer sleeves 20 and 21, and this spring 32 urges the outer sleeve 21 toward the right and normally holds it in position with the left hand ends of the slots 30 in contact with their respective studs 28, as shown in Figure 1.

There is an annular groove 34 in the outer surface of the fitting 11, and there are balls 36 located in angularly spaced openings around the circumference of the inner sleeve 20 in position to engage in the groove 34 when the fittings 11 and 12 are in contact with one another. When the outer sleeve 21 is in its normal position, as shown in Figure 1, it extends across the balls 36 and holds them down in the groove 34 so that the inner sleeve 20 cannot move longitudinally with respect to the fitting 11.

The fittings 11 and 12 do have some longitudinal movement with respect to one another while the balls 36 are engaged in the groove 34; this movement being limited by the width of the groove 26. For the present, it is sufficient to understand that in order to disconnect the coupling, the outer sleeve 21 must be pulled to the left in Figure 1, against the pressure of the spring 32, to bring a different portion of the sleeve 21 over the balls 36 so that the balls can move outwardly to clear the groove 34, as shown in Figure 3. Thus the sleeve 21 provides locking means for preventing the fittings 11 and 12 from being disconnected from one another, and this locking means is manually operable whenever the coupling is to be disconnected.

It will be understood that electrical or other power means can be substituted for manual operation of the locking means, and that the locking means can be operated manually by remote control through suitable motion-transmitting connections which form no part of the present invention and are, therefore, not illustrated.

Within the fitting 11 there is a valve element 40 having one end small enough to fit into the passage 16, and this small end of the valve element 40 slides within the passage 16 with a telescoping action. Near the other end of the valve element 40 there is a bearing surface 42 which slides along a complementary bearing surface provided by the inside face of the fitting 11. This bearing surface 42, and the outside surface at the small end of the valve element 40, which slides within the passage 16 as a bearing, permits the valve element 40 to move longitudinally in the coupling within a limited stroke.

In order to prevent leakage of fluid through the running clearance between the bearing surface 42 and the complementary bearing surface of the fitting 11, there is a bellows 44 secured at one end to the valve element 40 and at the other end to the fitting 11. This bellows may be silver soldered, brazed or otherwise connected to the valve element and the fitting, depending upon the temperature range and other conditions under which the coupling is designed to operate. There is a vent opening 46 through the valve element 40 for the flow of fluid into and out of the space between the valve element 40 and bellows 44.

The other fitting 12 contains a valve element 50 which is similar to the valve element 40 in its sliding movement lengthwise of the longitudinal axis of the coupling; and this valve element 50 has a bellows 54 similar to the bellows 44, and a vent opening 56 for the flow of fluid into and out of the space between the valve element 50 and its bellows 54.

At their confronting ends, the valve elements 40 and 50 are shaped so that the valve element 40 telescopes into the valve element 50, and there is a seal consisting of an O-ring 58 located in a circumferential groove in one of the valve elements for preventing leakage of fluid between the valve elements 40 and 50 along the confronting surfaces where the valve element 40 telescopes into the valve element 50. This O-ring is shown as contained in a groove in the valve element 50, but it will be understood that this groove could be in either of the valve elements.

There is an obstruction 60 located at the end of the fitting 11, and this obstruction 60 is rigidly connected to the fitting 11 by a bracket 62 extending from the hub of a spider 64 which is preferably of one piece construction with the fitting. Thus the obstruction 60 always remains in a fixed position in the fitting 11, and as the valve element 40 moves longitudinally toward the left, in Figure 1, it comes into contact with the obstruction 60, as shown in Figure 2.

In the illustrated construction there is a resilient surface or seat 66 on the part of the obstruction 60 with which the valve element 40 comes in contact. The purpose of this resilient surface is to obtain fluid tight sealing with lighter pressure than would otherwise be required. The bellows 44 is a spring bellows and provides a constant force for urging the valve element 40 toward the obstruction 60 whenever the valve element 40 is not held back, against the pressure of the bellows 44, by contact with the other valve element 50.

The resilient sealing element 66 is preferably made of light material having some resilience, such as steel, and its edges are welded or otherwise bonded to the sides of a circumferential groove into which the sides of the sealing element 66 extend. The material of the sealing element 66 is not limited to metals, but could be of any resilient material suitable for the intended application.

A vent passage 68 opens through the surface of the valve element 60 and into the space behind the resilient sealing element 66 to equalize the pressure on both sides of the sealing element 66.

There is an obstruction 70 at the end of the fitting 12. This obstruction 70 is similar in all respects to the obstruction 60 and it is connected to its fitting 12 in the same way and by structure identified by the same reference characters as the corresponding connecting parts for the obstruction 60.

In order to make the coupling of lighter weight, the obstructions 60 and 70 are made as hollow shells, also means are provided to prevent fluid from getting between these hollow shells because this would increase the amount of fluid spilled when the coupling is disconnected. The sealing means for preventing fluid from entering between obstructions 60 and 70 includes a bellows 74 compressed between partitions 76 and 77 attached to the obstructions 60 and 70, respectively. The bellows 74 is urged into its expanded condition by a spring 79.

When the coupling is connected together and in operating condition, the bellows 74 is compressed as shown in Figure 1. As the coupling is disconnected, and the obstructions 60 and 70 are moved apart, as shown in Figure 2, the bellows 74 expands and provides a seal preventing the flow of fluid into the space between the obstructions 60 and 70. In Figure 2 the valve elements 40 and 50 are shown in contact with the sealing elements 66 of the obstructions 60 and 70 so that flow of fluid, from the lines which are being disconnected, is prevented by the valve elements 40 and 50. However, it will be understood that just before these valve elements 40 and 50 contact with the sealing rings 66, and during the entire prior time when the obstructions 60 and 70 are moving apart, the bellows 74 is necessary to prevent leakage of fluid into the space between the obstructions 60 and 70.

The bellows 74 is preferably connected to the partition 77 of the obstruction 70 so that when the coupling is fully disconnected, as shown in Figure 3, the bellows 74 remains with the fitting 12. It is a feature of the invention that the fastening means, including the sleeves 20 and 21, and associated parts, also remain with the fitting 12 when the coupling is completely disconnected. This reduces the cost of the expendable part of the coupling if the fitting 11 is part of a missile or other device which may not be recovered after use.

From the description thus far it will be apparent that the valve elements 40 and 50 automatically move into closed position as the fittings 11 and 12 are separated during the disconnecting of the coupling. It will also be apparent that the coupling is constructed so that only a minimum of fluid is contained in that space, around the outside of the bellows 74, which is completely opened up when the coupling is disconnected. In the actual construction of this invention, the total amount of fluid spilled by opening of the coupling, with a coupling of moderate size and with the lines and the coupling full of fluid, amounts to less than three cubic inches. This figure is given merely by way of example and will depend, of course, upon the size of the passages through the coupling. In addition, when the lines are connected, these same features minimize the amount of air trapped in the coupling.

The obstructions 60 and 70 are preferably shaped so that the outside surface of these parts, when in contact with one another, is substantially an ellipsoid. The sealing elements 66 are raised slightly above the ellipsoidal surfaces of the obstructions 60 and 70, and the bulge of these sealing elements 66 is exaggerated in the drawing for clearer illustration. The ellipsoidal obstructions provide a surface of fair form around which the fluid can flow when passing in either direction through the coupling; and in the preferred construction, the annular clearance between each of the obstructions and its associated valve element, when the valve elements are in open position, has a cross section substantially equal to the cross section of the passage 16. This facilitates flow without turbulence, and thereby minimizes pressure drop through the fitting when flow occurs.

The description thus far has related to the disconnecting of lines while full of fluid; but it will be understood that the coupling is equally effective for connecting lines while full of fluid. The connecting of the lines entails a bringing together of the parts into the positions shown in Figure 2. The outer sleeve 21 is moved to the left, as in Figure 3, in order to permit the balls 36 to move over the outside of the fitting 11 to reach the groove 34.

When the parts have been assembled to the condition shown in Figure 2, the fittings 11 and 12 are locked together because the balls 36 are engaged in the groove 34 and the outer sleeve 21 has been moved into position to prevent the balls 34 from being disengaged with the groove 34.

Movement of the sleeve 21 from the Figure 3 position to the right and into the position shown in Figure 2 locks the fittings together. The sleeve 21 is then rotated in order to bring the obstructions 60 and 70 into contact with one another, and to force the valve elements 40 and 50 into open position by moving the fittings 11 and 12 closer together after the valve elements 60 and 70 are abutting one another. This rotation, through the studs 28, causes simultaneous rotation of the inner sleeve 20, which causes axial motion due to the cam features as shown in Figure 5.

Although the valve elements 40 and 50 have been described as movable longitudinally, such movement is relative and in the connecting of the fittings, as exemplified by the movement of the parts from the Figure 2 position to the Figure 1 position, it is actually the fittings 11 and 12, and the obstructions 60 and 70 which are integral with the fittings, which move while the valve elements 40 and 50 remain stationary. For purposes of comprehending the actual structure, however, the valve elements 40 and 50 can be considered as movable while the fittings 11 and 12 and the obstructions 60 and 70 are considered as fixed.

The Figures 6–9 show a modified form of the invention in which a right fitting 91 is connected with a left fitting 92. The right fitting 91 includes a shell 94 to which an end portion 95 is permanently connected, for example by brazing 96, or by any other suitable connecting means.

A portion of the shell 94 curves inwardly and provides an annular seat 98 against which a valve element 99 seats when in closed position. The valve element 99 has a stem 102 which slides in a bearing 103; and this bearing 103 is connected to the end portion 95 by legs 105 located at angularly spaced regions around the bearing 103, and comprising with the bearing 103 a spider for supporting the valve stem 102 with its axis in substantial alignment with the passage through the fitting 91.

There is a helical compression spring 108 which surrounds the valve stem 102 and which is compressed between the back of the valve element 99 and the front of the bearing 103. This spring 108 urges the valve element 99 into contact with the seat 98, thus giving the valve element 99 a bias toward closed position. For thrusting the valve element 99 into open position, there is a cam 112 which contacts with the face of the valve element 99.

The cam 112 is secured to a cam shaft 114 which extends into a lower bearing 116 at the bottom of the fitting 91 and through a bearing 118 at its upper end. This bearing 118 is formed in the wall of the fitting 91. Just above the bearing 118 there is packing 120 for sealing the bearing 118 against leakage, and this packing 120 is maintained under some compression by a spring 122 compressed against an end wall of a thimble 124, screwed into a counterbore in the outside face of the right coupling 91.

A handle 126 is attached to a collar 128 secured to the upper end of the cam shaft 114. The interior opening through the collar 128 is preferably polygonal and fits a polygonal or other non-circular section at the upper end of the cam shaft 114.

The collar 128 is shown as manually operated in the drawing, but it will be understood that it can be connected with a servo motor or any other mechanism for obtaining power operation useful for remote control.

The left fitting 92 has an end shell 130 permanently secured to a connector portion 132 by brazing 134, or other suitable connecting means. Within the composite structure provided by the shell 130 and connector portion 132, there is a valve element 139 corresponding to the valve element 99 at the other side of the connector. This valve element 139 seats against an inwardly curved surface of the shell 130 which forms a valve seat 142.

The valve seats 98 and 142 surround openings in the confronting end faces of the fittings 91 and 92, and each of the valve elements 99 and 139 extends axially partway into the openings surrounded by the valve seats. Thus the clearance in which fluid is held between the valve elements 99 and 139, when the valve elements are in closed position, is very small. This clearance represents the amount of liquid that is spilled when the valve elements 99 and 139 are closed, as shown in Figure 7, and the fittings 91 and 92 are then pulled apart to disconnect the fluid line.

The confronting faces of the valve elements 99 and 139 are shaped to receive the cam shaft 114 and the cam 112 when the cam is in the position shown in Figures 6 and 7. When the cam shaft 114 is rotated to bring the cam 112 into the position shown in Figures 8 and 9, however, the valve elements 99 and 139 are both thrust away from the cam shaft 114 and away from one another to move them into their open positions, as shown in Figure 8.

With the valve elements 99 and 139 in their open positions, there are annular passages 151 and 152 opening through the fittings 91 and 12, respectively, and because of the increased diameter at these passages 151 and 152, the total cross section for the flow of fluid is substantially the same as that in the sections of the fluid line which the coupling is used to connect.

The fittings 91 and 92 are held in assembled relation by balls 160 located in openings 162 at angularly spaced regions around the circumference of the fitting 91. These balls 160 fit into a circumferential groove 164 in the fitting 92. They are held in the groove 164, when the fittings are locked together, by a sleeve 166 which slides on the outside of the fitting 91.

A snap ring 168 prevents further movement of the sleeve 166 toward the left after the sleeve 166 is in locking position, and the sleeve 166 is held in this position by a spring 170 compressed between a shoulder on the sleeve 166 and another shoulder on the fitting 91.

When the fittings 91 and 92 are to be disconnected, the manual lever 126 or adaptor 128 is activated, causing shaft 114 and the cam 114A to rotate. Cam 114A in turn moves the pin 166A and the sleeve 166 is moved toward the right in Figure 7, against the pressure of the spring 170, until the larger diameter portion near the end of the sleeve 166 is over the balls 160. This provides sufficient clearance to permit the balls 160 to move radially outward so that they clear the circumferential groove 164 and permit the fittings 91 and 92 to be moved apart. This construction for locking the fittings together is similar in principal to that shown in Figures 1–3.

In order to prevent leakage between the confronting faces along which the fittings 91 and 92 come together, there is a sealing ring 175 secured to the fitting 91 and having a resilient portion which contacts with the cylindrical outer face of the shell 130 when the fitting 192 is brought into assembled relation with the fitting 91.

When the coupling is connected and operating to transport fluid, as shown in Figure 8, and it becomes necessary to disconnect it while full of fluid, the attendant turns the cam shaft 114 from the position shown in Figure 8 to the position shown in Figure 7. This permits the springs 108 to push the valve elements 99 and 139 into contact with their valve seats 98 and 142, respectively.

The sleeve 166 is then pulled toward the right in Figure 7 to permit clearance for the balls 160 to move out of the circumferential groove 164, as already explained, and the fittings 91 and 92 can then be separated without the spilling of any liquid other than the small amount contained in the clearances between the confronting faces of the valve elements 99 and 139.

Figures 7 and 8 show the fitting 92 secured to a bulkhead 178 by screws 180. This is one way in which the connector can be used, or both fittings 91 and 92 can be free depending upon the conditions under which the invention is to be used.

Two embodiments of the invention have been illustrated and described, but changes and modifications can be made, and some features can be used in different combinations without departing from the invention as defined in the claims.

What is claimed is:

1. A coupling for connecting and disconnecting a pair of fluid lines, one or both of which may contain fluid under pressure, said coupling comprising a pair of fittings respectively adapted for connection to the fluid lines and means for locking adjacent ends of said fittings together, said fittings having passageways therethrough for providing communication between the fluid lines, said passageways being progressively enlarged from the opposite ends of the fitting towards the adjacent ends of the fittings, each of said fittings having a pair of cooperative sealing elements, one of said elements being fixed relative to said fitting and axially disposed of said passageway and progressively enlarged from the opposite end of said fitting to said adjacent end to maintain the cross-sectional area of said passageway substantially constant through said fitting when said elements are out of sealing engagement, each of said one elements having a seat facing generally away from the adjacent end of its fitting, each of said fittings comprising a housing member having a bore opening on said adjacent end, the other of said sealing elements of each fitting being slidably mounted in said bore and defining at least in part the outer surface of said passageway through said fitting, said movable sealing element being movable into and out of sealing engagement with the seat on said fixed sealing member and spring means for automatically urging said movable sealing members into sealing engagement with said fixed members when said fittings are separated and means responsive to operation of said locking means for forcing said movable members out of sealing engagement when the fittings are connected together by said locking means.

2. A coupling as in claim 1 wherein the spring means comprises a resilient bellows in each of said fittings connected at one end to the bottom of the bore in said housing and at the other end to said movable sealing member.

3. A coupling as in claim 2 wherein each movable sealing member is outwardly flared to provide a chamber between said bellows and said movable sealing member and an opening in each of said movable members places said chamber in communication with the passageway through said fitting so that fluid pressure therein will urge said moving member into sealing engagement with said fixed member.

4. A coupling as in claim 3 wherein the movable sealing members are provided with telescoping mutually sealable end portions projecting beyond said fixed sealing members, which end portions are first brought into sealing engagement as the two fittings are connected together and wherein the movable sealing members are displaced out of sealing relation with said fixed sealing members in response to movement of the fittings into locked relationship.

5. A coupling as in claim 4 wherein the locking means are first operative to prevent inadvertent separation of said fittings once said movable sealing members have been telescoped into sealing relationship with each other and thereafter said locking means are operable to forceably bring said fittings into locked relationship and simultaneously displace said movable sealing members out of sealing engagement with said fixed sealing members.

6. A coupling as in claim 5 wherein the locking means comprise a pair of concentric sleeves mounted on and axially and rotatably movable relative to one of said fittings and further wherein a circumferential groove is formed on the other of said fittings, said locking means further comprising a series of balls carried on the inner of said concentric sleeves and the outer said concentric sleeve is yieldingly urged to bring said balls into gripping engagement with said circumferential groove in the other of said fittings when said movable sealing members are telescoped into mutual sealing relation and further wherein means responsive to rotative movement of said sleeves forceably cams the two fittings into locked relation thereby displacing said movable sealing members out of sealing engagement with said fixed sealing members.

7. A coupling as in claim 3 wherein a resilient gasket ring is secured to at least one of said sealing members, said gasket ring being generally in the form of a thin wall cylindrical shell bowed into contact with the respective cooperative sealing member when the sealing members are in sealing relation, said gasket being secured in cantilever fashion at the said adjacent end of the fitting.

8. A coupling as in claim 7 wherein gasket rings are secured to each of the fixed sealing members.

9. A coupling as in claim 8 wherein an opening is provided between the fitting passageway and the peripheral surfaces of the sealing gaskets facing said fixed sealing members, whereby fluid pressure in said passageways increases the effectiveness of said gasket rings.

10. A coupling as in claim 1 wherein the movable sealing members are provided with telescoping mutually sealable end portions projecting beyond said fixed sealing members which end portions are first brought into sealing engagement as the two fittings are connected together and wherein the movable sealing members are displaced out of sealing relation with said fixed sealing members in response to movement of the fittings into fully locked relationship.

11. A coupling as in claim 10 wherein the adjacent ends of said fixed sealing members are impervious and collapsible means are provided for filling the space between said fixed sealing members when the end portions of said movable sealing members are telescoped into mutually sealed relation.

12. A coupling as in claim 11 wherein the fixed sealing members are hollow and wherein the collapsible means comprises a bellows.

13. A coupling for connecting and disconnecting a pair of fluid lines, one or both of which may contain fluid under pressure, said coupling comprising a pair of fittings respectively adapted for connection to the fluid lines and means for locking adjacent ends of said fittings together, said fittings having passageways therethrough for providing communication between the fluid lines, each of said fittings having a pair of cooperative sealing elements, one of said elements being fixed relative to said fittings and axially disposed of said passageway, each of said fittings comprising a casing having a bore formed therein and opening on the said adjacent end of said fitting, the other of said sealing elements of each fitting comprising a member slidably movable in said bore and defining at least in part the outer surface of the passageway through said fitting and being axially movable and out of sealing engagement with said fixed sealing member, each of said fittings further having means for preventing flow of fluid between the bottom of said bore and said movable sealing member and for automatically moving said sealing members into sealing engagement with said fixed members when said fittings are separated and means for forcing said movable members out of sealing engagement when the fittings are fastened together by locking means.

14. A coupling as in claim 13 wherein said movable sealing member is outwardly flared at its adjacent end to provide a chamber between the movable members and the bellows and wherein an opening is provided between said chamber and said passageway to provide a fluid pressure force urging said movable member into sealing engagement with said fixed sealing member.

15. A coupling as in claim 14 wherein each bellows is provided with resilient characteristics also urging the movable sealing members into sealing engagement with the fixed sealing members.

References Cited in the file of this patent

UNITED STATES PATENTS

| | | |
|---|---|---|
| 2,218,318 | Pfauser | Oct. 15, 1940 |
| 2,254,997 | Fisher | Sept. 2, 1941 |
| 2,625,410 | Crowley | Jan. 13, 1953 |
| 2,729,471 | Fraser | Jan. 3, 1956 |

FOREIGN PATENTS

| | | |
|---|---|---|
| 865,201 | France | Feb. 17, 1941 |